United States Patent
Takano et al.

(10) Patent No.: US 8,000,421 B2
(45) Date of Patent: *Aug. 16, 2011

(54) WIRELESS COMMUNICATION SYSTEM, WIRELESS COMMUNICATION APPARATUS, WIRELESS COMMUNICATION METHOD, AND COMPUTER PROGRAM THEREFOR

(75) Inventors: Hiroaki Takano, Saitama (JP); Shinichi Kuroda, Tokyo (JP)

(73) Assignee: Sony Corporation, Tokyo (JP)

( * ) Notice: Subject to any disclaimer, the term of this patent is extended or adjusted under 35 U.S.C. 154(b) by 1819 days.

This patent is subject to a terminal disclaimer.

(21) Appl. No.: 11/119,465

(22) Filed: May 2, 2005

(65) Prior Publication Data

US 2005/0249304 A1 Nov. 10, 2005

(30) Foreign Application Priority Data

May 10, 2004 (JP) .................................. 2004-140486
Mar. 31, 2005 (JP) .................................. 2005-100543

(51) Int. Cl.
*H04B 1/10* (2006.01)

(52) U.S. Cl. .......................... 375/349; 375/260; 455/522

(58) Field of Classification Search .................. 375/134, 375/145, 149, 260, 267, 259, 316, 317, 318, 375/346, 349; 370/208, 210; 455/39, 500, 455/507, 517, 522, 93, 114.2, 114.3
See application file for complete search history.

(56) References Cited

U.S. PATENT DOCUMENTS

| | | | | |
|---|---|---|---|---|
| 5,852,630 A * | 12/1998 | Langberg et al. | ............. | 375/219 |
| 6,285,663 B1 * | 9/2001 | Esmailzadeh | ................. | 370/311 |
| 2002/0086690 A1 * | 7/2002 | Takahashi et al. | ............ | 455/502 |
| 2003/0003863 A1 * | 1/2003 | Thielecke et al. | .............. | 455/39 |
| 2004/0066866 A1 * | 4/2004 | Tong et al. | ..................... | 375/347 |
| 2004/0082356 A1 * | 4/2004 | Walton et al. | .................. | 455/522 |
| 2004/0141566 A1 * | 7/2004 | Kim et al. | ...................... | 375/267 |
| 2004/0192218 A1 * | 9/2004 | Oprea | .............................. | 455/73 |
| 2008/0170533 A1 * | 7/2008 | Cyzs et al. | .................... | 370/315 |
| 2008/0253279 A1 * | 10/2008 | Ma et al. | ....................... | 370/206 |

FOREIGN PATENT DOCUMENTS

| | | |
|---|---|---|
| JP | 2000-31936 | 1/2000 |
| WO | WO 2004/021634 A1 | 3/2004 |

* cited by examiner

*Primary Examiner* — Dac V Ha
*Assistant Examiner* — James M Perez
(74) *Attorney, Agent, or Firm* — Oblon, Spivak, McClelland, Maier & Neustadt, L.L.P.

(57) ABSTRACT

Communication operation is performed with enhanced transmission efficiency by obtaining enhanced communication capacity through optimal allocation of transmission powers to individual MIMO channels obtainable by spatial multiplexing. A transmitter has a plurality of transmission antennas and a receiver has a plurality of reception antennas and perform spatial multiplex communication through transmission and reception with individual antenna weights being set. The transmitter varies the power allocation in units of a communication channel in correspondence to communication quality of the channel. The receiver uses a power allocation value of each communication channel that is estimated in accordance with a reception power of a pilot carrier included in user data after spatially separated. Thereby, the receiver returns the magnitude of the amplitude of a received signal in the signal spacing to an original magnitude, and performs an accurate demapping process.

22 Claims, 6 Drawing Sheets

FIG.2
| POWER ALLOCATION INFORMATION | REFERENCE SIGNAL WEIGHTED WITH V | USER DATA |
FIG.3
| REFERENCE SIGNAL WEIGHTED WITH V | REFERENCE INFORMATION FOR POWER ALLOCATION ACQUISITION | USER DATA |
FIG.4
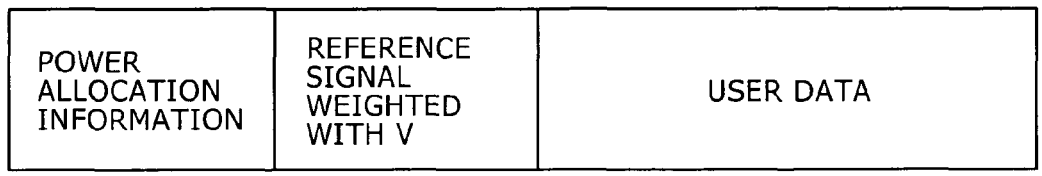
FIG.5
| REFERENCE INFORMATION FOR POWER ALLOCATION ACQUISITION | USER DATA |
FIG.6
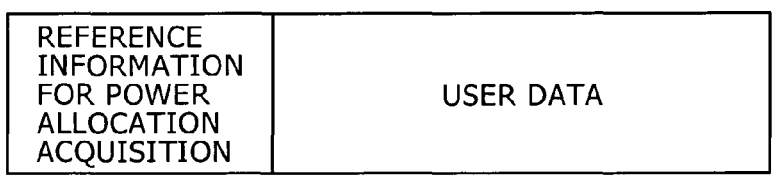

WIRELESS COMMUNICATION SYSTEM, WIRELESS COMMUNICATION APPARATUS, WIRELESS COMMUNICATION METHOD, AND COMPUTER PROGRAM THEREFOR

CROSS REFERENCES TO RELATED APPLICATIONS

The present invention contains subject matter related to Japanese Patent Applications JP 2004-140486 filed in the Japanese Patent Office on May 10, 2004, and JP 2005-100543 filed in the Japanese Patent Office on Mar. 31, 2005, the entire contents of which being incorporated herein by reference.

BACKGROUND OF THE INVENTION

1. Field of the Invention

The invention relates to a wireless communication system, a wireless communication apparatus, a wireless communication method, and a computer program therefor that perform intercommunication between multiple radio stations as in the case of a LAN (local area network). More specifically, the invention relates to a wireless communication system, a wireless communication apparatus, a wireless communication method, and a computer program therefor that implement broadband wireless communication in communication environments such as home.

More specifically, the invention relates to a wireless communication system, a wireless communication apparatus, a wireless communication method, and a computer program therefor that implement transmission capacity enhancement through communication (MIMO (multi-input multi-output) communication) wherein multiple logical channels are formed by using spatial multiplexing between a transmitter and a transmitter in a pair, the transmitter having multiple antennas and the receiver having multiple antennas. More specifically, the invention relates to a wireless communication system, a wireless communication apparatus, a wireless communication method, and a computer program therefor that perform communication operation with high transmission efficiency by using an increased communication capacity acquired by performing optimal allocation of transmission powers to multiple logical channels obtainable by spatial multiplexing.

2. Description of the Related Art

Sharing such as information resource sharing and device resource sharing can be efficiently implemented through computer networking across a network represented by, for example, a LAN (local area network). As a system relieving users from LAN wiring in accordance with a hardwire method having been used, attention is now drawn to wireless LANs. With a wireless LAN, in an operation spacing such as an office work, since most of hardwiring can be omitted, communication terminals, such as personal computers (PCs), can be relatively easily moved.

Under recent commercial market circumstances wherein wireless LAN systems with enhanced communication speed become available at reduced prices, demands therefor are significantly increasing. Particularly, a personal area network (PAN) has been studied and taken into consideration for introduction to perform information communication by forming a small-scale wireless network between multiple electronic devices existing around individual user bodies. Different wireless communication systems and wireless communication apparatuses are regulated with the use of frequency bands, such as a 2.4 GHz band and a 5 GHz band, for which governmental licenses are not necessary.

Standards regarding wireless networks include, but not limited to, IEEE (The Institute of Electrical and Electronics Engineering) 802.11 (see Non-Patent Document 1(*), for example), HiperLAN/2 (see Non-Patent Document 2(*) or 3(*), for example), IEEE 302.15.3, and Bluetooth communication. Regarding the IEEE 802.11 standard, there are extended standards such as IEEE 802.11a (see Non-Patent Document 4(*), for example), 11b, and 11g.

The IEEE 802.11a standard supports a modulation method that achieves a maximum transmission speed of 54 Mbps. However, radio standard specifications allowing even higher bit rates are sought. For example, according to IEEE 802.11n, standards on next-generation wireless (or, radio) LANs are established with an aim for development of wireless LAN techniques having a high processing rate exceeding 100 MBPS in execution throughput.

As one of the techniques of enhancing wireless transmission speeds, attention has been and is focused on MIMO (multi-input multi-output) communication scheme. The MIMO communication scheme is a scheme that includes pluralities of antenna devices on on individual sides of a transmitter and a receiver to implement spatially multiplexed transmission lines (which hereinbelow will be alternatively referred to as "MIMO channels"), thereby implementing the transmission capacity enhancement and, consequently, accomplishing the transmission speed enhancement. The MIMO communication uses the spatial multiplexing, so that it exhibits high frequency use efficiency.

The MIMO communication scheme is a communication scheme that uses channel characteristics in the following manner. In the transmitter, transmission data are allocated and sent to the multiple antennas and are transmitted by using multiple virtual or logical MIMO channels. In the receiver, reception data is received through signal processing from signals received through the plurality of antennas. As such, the scheme is different from a simple transmission/reception adaptive array.

FIG. 8 is a conceptual representation of a MIMO communication system. With reference to the figure, multiple antennas are deployed individually at a transmitter and a receiver. On the side of the transmitter, multiple items of transmission data are multiplexed through space-time coding (which alternatively will be expressed as "space-time coded," hereafter), allocated to M (=positive integer) antennas and sent therefrom to multiple MIMO channels. On the side of the receiver, reception signals received by N (=positive integer) antennas through the channels can be acquired through space-time decoding (which alternatively will be termed "space-time decoded," hereafter). A channel model in this case is configured of a radio environment (transfer function) around the transmitter, a channel space structure (transfer function), and a radio environment (transfer function) around the receiver. While crosstalk occurs during the multiplexing of the signals transmitted from the individual antennas, individual signals multiplexed by signal processing of the receiver can be received in correct forms without crosstalk.

Various types of configuration method for MIMO communication have been proposed. In this case, a big problem in forming the configuration is how to cause channel information to be communicable between a transmitter and a receiver in correspondence to antenna configurations.

An easy method for communication of the channel information is to transmit preliminarily known information (preamble information) from the transmitter to only the receiver. In this case, the transmitter and the receiver spatial perform spatial multiplex transmission independently of each other. This is called an "open-loop MIMO communication scheme (system)." In addition, as an extended form of the scheme, there are known closed-loop MIMO communication schemes wherein preamble information is fed back from the receiver to also the transmitter, thereby to create ideal spatial orthogonal channels between the transmitter the receiver.

Open-loop MIMO communication schemes include, for example, a V-BLAST (Vertical Bell Laboratories Layered Space Time) scheme (see Patent Document 1(*), for example). On the side of transmitter, a specific antenna matrix is not provided, but signals are simply multiplexed and sent to individual antennas. That is, a feedback procedure to obtain an antenna matrix is totally omitted. Before transmitting the multiplexed signal, the transmitter time-divisional interleaves a training signal in units of the antenna for being used for channel estimation on the side of the receiver. In response, in the receiver, channel estimation is performed in a channel estimation section thereby to calculate a channel matrix H corresponding to individual antenna pairs. Then, zero-forcing and canceling are well combined, whereby the degree of antenna freedom caused by canceling is used to improve the SN (signal to noise) ratio ("SNR," hereafter) and to thereby improve decoding accuracy.

In addition, as an ideal type of closed-loop MIMO communication, an SVD-MIMO scheme using propagation-path SVD (SVD: singular value decomposition) is known (see Non-Patent Document 5(*), for example).

FIG. 9 is a conceptual view showing an SVD-MIMO communication system. In SVD-MIMO communication, a numeric matrix formed of elements of channel information corresponding to individual antennas, namely, the channel matrix H is decomposed by the singular value decomposition to obtain $UDV^H$, whereby V is given as an transmission antenna weight matrix on the side of the transmitter, and $U^H$ is given as the antenna weight factor matrix on the side of the receiver. In this manner, the individual MIMO channels are represented as a diagonal matrix D having the square roots of individual eigenvalues $\lambda_i$ as diagonal elements, whereby signals completely free of crosstalk can be multiplexed and transmitted. In this case, a plurality of logically mutually-independent transmission paths spatial-divided, that is, spatial-orthogonal multiplexed can be implemented on both sides of the transmitter and the receiver.

According to the SVD-MIMO communication scheme, a logically maximum communication capacity can be accomplished. As such, with the transmitter and the receiver each having two antennas, a double transmission capacity at maximum can be acquired.

A mechanism of the SVD-MIMO communication scheme will now be described in detail here. Where the number of antennas of the transmitter is M, a transmission signal x is denoted by an M×1 vector; and where the number of antennas of the receiver is N, a transmission signal y is denoted by an N×1 vector. In this case, the channel characteristics are denoted by an N×M numeric matrix, that is, the channel matrix H. An element $h_{ij}$ of the channel matrix H is a transfer function from a j-th transmission antenna to an i-th reception antenna. The reception signal vector y is represented by equation (1) given below, wherein the channel matrix H is multiplied by the transmission signal vector, and a noise vector n is added.

$$y = Hx + n \quad (1)$$

As described above, when the channel matrix H is decomposed by the singular value decomposition, the result is represented by equation (2) given below.

$$H = UDV^H \quad (2)$$

A transmission antenna weight matrix V on the side of the transmitter side and a reception antenna weight matrix U on the side of the receiver are, respectively, unitary matrixes satisfying equations (3) and (4) given below.

$$U^H U = I \quad (3)$$

$$V^H V = I \quad (4)$$

More specifically, an arrangement of normalized eigenvectors of $HH^H$ is a reception antenna weight matrix $U^H$ on the side of the receiver, and an arrangement of normalized eigenvectors of $H^H H$ is a transmission antenna weight matrix V on the side of the transmitter. D denotes a diagonal matrix having square roots of eigenvalues of either $H^H H$ or $HH^H$ as diagonal components. The matrix has a size represented by the smaller of the number of transmission antennas M and the number of reception antennas N, therefore forming a square matrix or diagonal matrix having the size of min[M,N].

$$D = \begin{bmatrix} \sqrt{\lambda_1} & \cdots & & 0 \\ \vdots & \sqrt{\lambda_2} & & \\ & & \ddots & \\ 0 & & & \sqrt{\lambda_{min(M,N)}} \end{bmatrix} \quad (5)$$

Hereinabove, although the singular value decomposition has been described using the real numbers, cautions exists on singular value decomposition when being extended to the magnitude of each of the complex numbers. Whereas U and V each represent the matrix formed of eigenvectors, even when the eigenvectors are steered or normalized so that the norm thereof becomes equal to one, the eigenvectors are not singularized, but there are an infinite number of eigenvectors having phases different from one another. Even a case takes place in which the above equation (2) is not satisfied depending on the phase relation between U and V. This is because while U and V are individually correct, only the individual phases arbitrarily rotate. To completely match the phases, V is acquired as the eigenvectors of $H^H H$ in the regular procedure. Concurrently, U is acquired such that V is multiplied from the right by both sides of the above equation (2), as in equation (6) given below.

$$HV = UDV^H V = UDI = UD$$

$$U = HVD^{-1} \quad (6)$$

When weighting is performed using the transmission antenna weight matrix V on the side of the transmitter and when reception is performed by performing weighting with the reception antenna weight matrix $U^H$ on the side of the receiver, since U and V are individually the unitary matrixes (U=N×min[M,N]; V=M×min[M,N]), V is represented by equation (7) given below.

$$y = U^H HVx + U^H n \quad (7)$$
$$= U^H (UDV^H)Vx + U^H n$$
$$= (U^H U)D(V^H V)x + U^H n$$
$$= IDIx + U^H n$$
$$y = Dx + U^H n$$

The reception signal y and the transmission signal x are, respectively, not vectors determined by the number of transmission antennas and the number of reception antennas, but are (min[M,N]×1) vectors.

Since D is the diagonal matrix, individual transmission signals can be received without crosstalk being caused. In addition, since the amplitudes of the individual mutually-independent MIMO channels are proportional to the square roots of the eigenvalues $\lambda$, power levels of the individual MIMO channels are proportional to $\lambda$.

Also in regard to the noise components n, the column of U is an eigenvector of which the norm is normalized to one, so that $U^H n$ is not of a nature that varies the noise power thereof. In regard to the size, $U^H n$ becomes a (min[M,N]) vector, so that it has the same size as y and x.

As described above, in the SVD-MIMO communication, although at the same frequency and the same time, a plurality of logically mutually-independent crosstalk-free MIMO channels can be acquired. That is, by using the same frequency at the same time, multiple items of data can be transmitted through wireless communication, and the transmission speed enhancement can be implemented.

Generally, the number of MIMO channels obtainable in the SVD-MIMO communication system corresponds to the smaller of the number of transmission antennas M and the number of reception antennas N, that is, min[M,N]. The transmission antenna weight matrix V on the side of the transmitter is configured of transmission vectors $V_i$ ($V$="$V_1, V_2, \ldots, V_{min}[M,N]$") corresponding to the number of MIMO channels. In addition, the number of elements of the individual transmission vectors $V_i$ corresponds to the number of transmission antennas M.

Generally, it is known that even more ideal information transmission can be implemented with the closed-loop MIMO scheme represented by the SVD-MIMO scheme in such a manner that the transmission path information is taken into account thereby to optimize the calculation of optimal antenna weight factors, coding rates that are to be provided to bit streams of the individual antennas, and modulation techniques.

In addition, to adopt the closed-loop MIMO scheme as a real system, other problems arise. In the event that channel variations increase in association with the movement of the transmitter and the receiver, there occurs an increase in frequency of necessary feedback from the receiver to the transmitter increases. Further, in the SVD-MIMO communication scheme, it is not easy to perform the operation of singular value decomposition in real time, and a setup procedure for preliminarily notification of V or $U^H$ to a destination is necessary.

The following will describe a case incorporating consideration regarding the amount of information of the transmission antenna weight matrix V on the side of the transmitter ("V transmission antenna weight factor matrix," hereafter) by reference to, as an example, the IEEE 802.11a system, which is a LAN system usable as an adaptation object of the SVD-MIMO communication, more specifically, a 5-GHz band OFDM (orthogonal frequency division multiplexing) communication scheme. If the numbers of transmission/reception antenna elements are each three, the transmission antenna weight matrix V is a 3×3 matrix, and the number of elements thereof is nine. When the matrix is represented by real numbers and complex numbers having an accuracy of 10 bits per element and it is necessary for 52 carriers, 9360 bits (=9 (number of elements of the matrix)×2 (real part and imaginary part of the complex number))×10 (bits)×52 (number of OFDM sub-carriers) have to be fed back to the transmitter from the receiver.

The following will describes matters that should be considered when configuring an actual SVD-MIMO communication system.

According to a basic configuration of the SVD-MIMO communication scheme, in the receiver, the acquired channel matrix H is decomposed by the singular value decomposition, the reception weight matrix $U^H$ and the transmission weight matrix V is acquired, and V is fed back to the transmitter. V is used as a transmission weight on the side of the transmitter.

However, in an event where, for example, the amount of information of V is large and hence the information of V is reduced and transmitted, the inter-MIMO-channel orthogonal state is collapsed because of a difference from the original information of the matrix, and crosstalk is generated thereby.

As such, ordinarily, after the transmission antenna weight matrix V received by the receiver has been sent to the transmitter, the transmitter weights a reference signal by using V to thereby transmit the signal, and the receiver re-acquires the channel matrix. When the channel matrix is H, the receiver can acquire a channel matrix HV from the reference signal weighted with V and transmitted.

On the side of the receiver, an inverse matrix of HV is acquired and used as a reception weight. Since $H=UDV^H$, HV is represented by equation (8) given below.

$$HV = UDV^H V \qquad (8)$$
$$= UD$$
$$(HV)^- = (UD)^- = D^- U^- = D^- U^H$$

The above is simply acquired such that after the same $U^H$ as that of the ordinary SVD-MIMO is used as the reception weight, a constant obtainable from a respective diagonal element $\lambda_i$ of the diagonal matrix D is multiplied by the respective separated MIMO channel.

Thus, in the configuration, V is used as the transmission weight on the side of the transmitter, and the inverse matrix of HV is used as a reception weight on the side of the receiver. This configuration has the same performance as the performance of the ordinary SVD-MIMO, wherein no mismatch in V exists between the sides of the transmitter and the receiver. Accordingly, the configuration can be employed in a practical application.

Notes (*)

Patent Document 1: Japanese Unexamined Patent Application Publication No. 10-84324 (or, 1991-84324)

Non-Patent Document 1: International Standard ISO/IEC 8802-11: 1999(E) ANSI/IEEE Std 802.11, 1999 Edition, Part II: Wireless LAN Medium Access Control (MAC) and Physical Layer (PHY) Specifications Non-Patent Document 2: ETSI Standard ETSI TS 101 761-1 V1.3.1 Broadband Radio Access Networks (BRAN); HIPERLAN Type 2; Data Link Control (DLC) Layer; Part 1: Basic Data Transport Functions Non-Patent Document 3: ETSI TS 101 761-2 V1.3.1 Broadband Radio Access Networks (BRAN); HIPERLAN Type 2; Data Link Control (DLC) Layer; Part 2: Radio Link Control (RLC) sublayer Non-Patent Document 4: Supplement to IEEE Standard for Information Technology-Telecommunications and information exchange between systems-Local and metropolitan area networks-Specific requirements-Part II: Wireless LAN Medium Access Control (MAC) and Physical Layer (PHY) specifications: High-speed Physical Layer in the 5 GHz Band Non-Patent Document 5: http://radio3.ee.uec.ac.jp/MIMO (IEICE_TS).pdf (As of Oct. 24, 2003)

As described above, according to the SVD-MIMO communication scheme, a plurality of logical mutually-independent communication paths (MIMO channels) not having interference (crosstalk) with one another even at the same frequency and the same time can be acquired. In more particular, the communication scheme enables transmission of multiple items of data thorough wireless communication by using the same frequency at the same time. Thereby, transmission speed enhancement can be implemented.

According to the SVD-MIMO communication scheme, weighting is performed by using the transmission antenna weight matrix V on the side of the transmitter, and weighting is performed by using the $U^H$ antenna weight factor matrix on the side of the receiver, so that the reception signal y relative to the transmission signal x is expressed as in the above equation (7). In addition, since D is the diagonal matrix, individual transmission signals can be received without crosstalk. Further, since the amplitudes of the individual mutually-independent MIMO channels are proportional to the square roots of the eigenvalues $\lambda$, power levels of the individual MIMO channels are proportional to $\lambda$.

This implies that when the power is equally allocated to the transmission antennas on the side of the transmitter, each ratio thereof is the same as each of the ratios of the powers of the mutually independent MIMO channels.

Meanwhile, communication quality levels of the MIMO channels are not equal to one another, and the MIMO channels mixedly contains MIMO channels having low signal-to-noise ratios (SNRs) and MIMO channels having high SNRs. The communication quality level of an i-th MIMO channel corresponds to the eigenvalue $\lambda_i$ that represents the diagonal element of the diagonal matrix D.

In the case that the power allocation to the individual MIMO channels is optimized, a communication capacity larger than that in the case of equal power allocations to the individual MIMO channels can be acquired. (In particular, the communication capacity is enhanced by allocation of transmission powers by MIMO channels having high communication quality (i.e., having large eigenvalues $\lambda_i$), as will be described in detail below.)

For example, where two MIMO channels are prepared and the overall transmission power is assumed to be 1.0, the power is allocated by 0.7 and 0.3.

However, where the power allocation is thus varied in units of the spatially multiplexed channel, accurate demapping cannot be executed on the side of the receiver.

This is because the varied power allocations vary the magnitudes of the amplitudes of reception signal points in a constellation (signal space). In an ordinary case, in any mapping scheme of BPSK (binary phase shift keying), QPSK (quadrature phase shift keying), 16QAM (quadrature amplitude modulated), 64QAM, and 256QAM, the average of powers is normalized to one under the assumption that all the signal points in the constellation are used, and the signal points are mapped. However, when the power allocations are varied, it is not guaranteed that the average of powers is normalized to one.

In the case of, for example, the BPSK or QPSK, demapping can be performed only by reference to the negative-positive relations of the reception signal points in the constellation on the individual coordinate axes, so that it is not necessary to all time guarantee the average of powers to be one. In comparison, however, in the scheme such as 16QAM, a plurality of signal points are mapped within a single quadrant of the constellation. As such, accurate demapping cannot be guaranteed by reference to the negative-positive relations on the individual coordinate axes, so that the average of powers has to be guaranteed to be one. More specifically, when the power allocations have been varied, the reception signal points have to be returned to the original magnitudes of the amplitudes on the side of the receiver.

SUMMARY OF THE INVENTION

The invention is made in view of the technical problems, and it is desirable to provide an excellent wireless communication system, an excellent wireless communication apparatus, an excellent wireless communication method, and an excellent computer program therefor that are capable of implementing transmission capacity enhancement by performing MIMO communication wherein multiple logical channels are formed by using spatial multiplexing between a transmitter and receiver in a pair, the transmitter having multiple antennas and the receiver having multiple antennas.

Further, it is desirable to provide an excellent wireless communication system, an excellent wireless communication apparatus, an excellent wireless communication method, and an excellent computer program therefor that are capable of performing communication operation with high transmission efficiency by using enhanced communication capacity acquired by performing optimal allocation of transmission powers to individual MIMO channels obtainable by spatial multiplexing.

Further it is desirable to provide an excellent wireless communication system, an excellent wireless communication apparatus, an excellent wireless communication method, and an excellent computer program therefor, wherein transmission data transmitted by being spatially multiplexed by varying the power allocation in units of a MIMO channel can be spatially demultiplexed and further be accurately demapped in accordance with a power allocation value.

The invention is made by reference to the above-described problems. According to a first embodiment of the invention, there is provided a wireless communication system for performing data communication by using a plurality of spatially multiplexed communication channels between a transmitter and a receiver, wherein in the transmitter, a transmission power is allocated to each of the communication channels, mapped in signal spacing, and spatially multiplexed, whereby data communication is performed; and in the receiver, power allocation information of the each communication channel is acquired, received data is spatially separated, and demapping is performed in accordance with the power allocation information.

The term "system" as used herein refers to a physical assembly logically formed of a plurality of apparatuses or devices (or, functional modules that implement specific functionalities), and it does not matter whether or not the functional module of each of the apparatuses or devices exists in a single housing.

The wireless communication system according to the embodiment of the invention employs, for example, a MIMO communication scheme. This enables enhancing the transmission capacity by using a plurality of spatially multiplexed transmission paths, thereby consequently enabling enhancing the transmission speed. In this case, the transmitter and the receiver each include a plurality of antennas. The transmitter allocates transmission data to a plurality of streams and performs weighting transmission thereof from each of the antennas of its own (or, transmission antennas). The receiver performs weighting reception of the streams through each of antennas of its own (or, reception antennas).

The wireless communication system according to the embodiment of the invention may employ a closed-loop MIMO communication scheme represented by an SVD-MIMO communication scheme. In this case, the transmitter acquires optimal transmission antenna weight factors in accordance with feedback information from the receiver.

In this case, power allocations to individual MIMO channels are optimized, thereby enabling acquiring a communication capacity greater than that in the case of equal power allocations to the individual MIMO channels. In particular, increased transmission powers are allocated through the MIMO channels having high communication quality, thereby to increase the communication capacity.

However, in the case of varying the power allocation in units of the spatially multiplexed channel, a problem occurs in that accurate demapping cannot be performed on the side of the receiver.

As such, in the wireless communication system according to the embodiment of the invention, the configuration is arranged such that the receiver acquires power allocation information of individual communication channels, performs spatial separation of received data, and further performs demapping thereof in accordance with power allocation information. In particular, using power allocation values allocated to the individual communication channels, the receiver returns the magnitudes of the amplitudes of reception signal points in signal spacing in the respective communication channel to original magnitudes, thereby performing accurate demapping process.

The receiver is able to acquire power allocation information of the each communication channel in accordance with power information included in a reference signal transmitted from the transmitter, for example.

However, in the case of transmitting the power allocation information by using the reference signal, a problem occurs in that, in addition to the user data, the reference signal, which is unnecessary, is added to a transmission frame, thereby reducing the transmission efficiency.

For this reason, the receiver may estimate a power allocation of the each communication channel in accordance with a reception power of user data after spatially separated.

Specifically, the receiver can estimate the power allocation of the each communication channel in accordance with a reception power of a pilot carrier included in the user data after spatially separated.

According to IEEE 802.11a, which is a LAN system being used as an adaptation object of SVD-MIMO communication, it is specified that four known or existing parallel carriers be interleaved into 52 OFDM subcarriers. The pilot carrier takes the value of ±1, so that the value of one pilot carrier can be taken our from the user data. Alternatively, an average of a plurality of parallel carrier values taken out of the user data to thereby eliminate influence of noise, whereby the power allocation in the corresponding MIMO channel can be more accurately estimated.

Inherently, pilot carriers are used to correct for phase rotation associated with clock error between a transmitter and a receiver. However, the present invention has a feature in that pilot carriers are used also to correct for amplitude variations, i.e., power directions in the signal points.

Improving the accuracy of the power allocation estimation on the side of the receiver enables improving determination accuracy of demapping of a subsequent stage thereof, consequently leading to performance enhancement of the entirety of the receiver.

For example, the receiver becomes able to estimate an accurate power allocation of the each stream using not only a signal power of the reception signal, but also likelihood information of the each stream signal. Further, even more accurate demapping can be implemented by reference to the power allocation estimation information.

In more detail, the receiver performs detections of powers of the pilot carriers included in the user data and uses, as a base for accuracy of a value of the respective detection, a likelihood estimation value of the signal, thereby enabling even more accurate estimation of the power allocation of the each stream. In practice, detection values of a plurality of signal powers are averaged to thereby estimate the power allocation of the respective stream. In this case, weighting is performed with the likelihood estimation value. More specifically, the processing is arranged such that an even more accurate power estimation value for the stream is acquired through weighting and averaging of a reception power of the stream.

In the case that the receiver acquires the power allocation of the respective stream by using the likelihood information of the each signal as well as the signal power of the reception signal after spatially demultiplexed, the receiver has to acquire the likelihood information of the each stream in accordance with a certain method.

In MIMO communication, the receiving means estimates a channel matrix of logical channels, acquires an antenna weight matrix in accordance with the estimated channel matrix, and multiplies the received signals from the individual antennas by the antenna weight matrix, thereby to perform spatial separation into individual stream signals. In this case, the likelihood estimation means is able to estimate the likelihood information in accordance with the antenna weight matrix. For example, it is assumed that, predicting that expected values of signal amplitude values after spatially decoded (which will be alternatively referred to as "post-spatial-decoding signal amplitude values," depending on the case) equally become 1, the square norm of the weight vector of the respective stream becomes equal to the gain of the noise power. In this case, the SNR regarding the each post-spatial-decoding stream is acquired from the inverse number of the square norm of the antenna weight vector of the stream, whereby the likelihood amplitude formed of the square root of the SNR estimation value can be used as the likelihood information.

Alternatively, in the case that the channel matrix is estimated in accordance with an MMSE (minimum mean square error) algorithm based on the logic of maximizing the ratio between a signal power and a square error, crosstalk (inter-stream interference) in the event of the antenna weight matrix calculation is intentionally generated, and the expected value of the post-spatial-decoding signal amplitude value is not limited to 1. In view of these facts, it is considered difficult to expect accuracy from the likelihood estimation value using only the antenna reception weight matrix. As such, the likelihood information may be more accurately estimated in accordance with three items of information, namely, estimated channel matrix, antenna reception weight matrix, and estimated noise power. More specifically, a signal power S, an interference power I, and a noise power N are directly calculated in units of the post-spatial-decoding stream signal from the estimated channel matrix, the antenna reception weight matrix, and the estimated noise power, respectively, and the likelihood amplitude configured of the square root of S/(I+N) is used as the likelihood information.

The noise power value included in the each stream in the state after spatial decoding can be acquired by the product of a square norm of the antenna weight vector of the stream multiplied by a noise power included in the signal in a state before spatial decoding.

In addition, the expected value of the signal amplitude of the each post-spatial-decoding stream can be acquired from a scalar product of the antenna weight vector and channel vector in the stream. As such, the result acquired through a subtraction of the noise power performed on a power value calculated from the square norm of the scalar product of the antenna weight vector and the channel vector in the each stream can be acquired as a true signal power estimation value of the stream.

The amplitude of an interference signal of the each post-spatial-decoding stream can be acquired from the scalar product of the antenna weight vector of the stream and channel vectors of other streams. As such, an interference signal power in the stream can be is acquired from a total sum of square norms of the scalar products.

Thus, the system uses not only an antenna weight matrix, but also a noise power estimation value, i.e., the estimation value of the noise power included in the pre-spatial-decoding reception signal (or, reception signal in the state before spatial decoding) and the estimated channel matrix, which are used in the MMSE processing. Thereby, the system estimates the individual noise power, signal power, and interference power in the each post-spatial-decoding stream signal, and acquires the SINR from these estimation values, whereby the likelihood amplitude information configured of the square root thereof can be used as likelihood information having even higher probability can be used.

According to a second embodiment of the invention, there is provided a computer program written in a computer readable format to execute a process of receiving data transmitted by using a plurality of spatially multiplexed communication channels, wherein a transmission power is allocated to each of the communication channels on the side of the transmittere, the computer program having a receiving step that receives a signal from each of the communication channel and performs spatial separation thereof; a power allocation information acquisition step that acquires power allocation information of the each communication channel; and a demodulating step that performs demapping of a reception signal in the each communication channel spatially separated in accordance with the power allocation information acquired.

The computer program according to the second embodiment of the invention defines a computer program written in a computer readable format to implement predetermined processing in a computer system. More specifically, by installing the computer program according to the second embodiment of the invention in the computer program, cooperative effects are exhibited in the computer program, thereby enabling a communication apparatus including a plurality of antennas to operate as a MIMO receiver. Operational advantages and effects similar to those of the wireless communication system according to the first embodiment of the invention can be obtained in the manner that the MIMO receiver is activated to configure a plurality of wireless networks in cooperation with a transmitter including a plurality of antennas.

According to the embodiment of the invention, an excellent wireless communication system, wireless communication apparatus, excellent wireless communication method, and computer program therefor can be provided that are capable of implementing transmission capacity enhancement by performing MIMO communication wherein a plurality of logical channels are formed by using spatial multiplexing between a transmitter and receiver in a pair, the transmitter having a plurality of antennas and the receiver having a plurality of antennas.

Further, an excellent wireless communication system, an excellent wireless communication apparatus, an excellent wireless communication method, and an excellent computer program therefor can be provided that are capable of performing communication operation with high transmission efficiency by using an enhanced communication capacity acquired by performing optimal allocation of transmission powers to individual MIMO channels obtainable by spatial multiplexing.

Further, an excellent wireless communication system, an excellent wireless communication apparatus, an excellent wireless communication method, and an excellent computer program therefor can be provided in which transmission data transmitted by being spatially multiplexed by varying the power allocation in units of a MIMO channel can be spatially demultiplexed and further be accurately demapped in accordance with a power allocation value.

Furthermore, the receiver becomes able to estimate an accurate power allocation of the each stream by using not only a reception power of user data in units of a stream in the state after a received signal is spatially separated, that is, spatially decoded, but also likelihood information of each stream signal. Further, even more accurate demapping can be implemented by reference to information of the power allocation estimation having thus obtained, consequently leading to enhancement in the performance of the entirety of the receiver.

These and other embodiments, features, and advantages of the invention will become apparent from more detailed description given below in accordance with the ongoing embodiments, appended drawings, and the like.

BRIEF DESCRIPTION OF THE DRAWINGS

In the accompanying drawings:

FIG. 2 is a view showing an example configuration of a transmission frame;

FIG. 3 is a view showing an example configuration of a transmission frame;

FIG. 4 is a view showing an example configuration of the transmission frame;

FIG. 5 is a view showing an example configuration of a transmission frame;

FIG. 6 is a view showing an example configuration of the transmission frame;

DETAILED DESCRIPTION OF PREFERRED EMBODIMENTS

Embodiments of the invention will be described in detail below with reference the drawings.

The invention relates to a MIMO communication system wherein signals are communicated by being spatially multiplexed between a pair of a transmitter having a plurality of antennas and a receiver having a plurality of antennas. Description is made below with reference to, as an example, IEEE 802.11a that is a LAN system being used as an adaptation object of MIMO communication.

The system configuration is arranged such that power allocation to individual MIMO channels is optimized to obtain a communication capacity greater than that in the case of equal power allocation to the individual MIMO channels. In particular, enhanced transmission powers are allocated through the MIMO channels having high communication quality, thereby to increase the communication capacity.

In the case of varying the power allocation in units of the spatially multiplexed channel, the problem occurs in that accurate demapping cannot be performed on side of the receiver, as described above. However, in the present invention, the configuration is arranged such that the receiver acquires power allocation information of individual communication channels, performs spatial separation of received data, and further performs demapping (demapping process) of the received data in accordance with the power allocation information. In particular, using power allocation values allocated to the individual communication channels, the receiver returns the magnitudes of the amplitudes of reception signal points in the signal spacing in the respective communication channel to the original magnitudes, thereby performing accurate demapping process.

Figure 1:
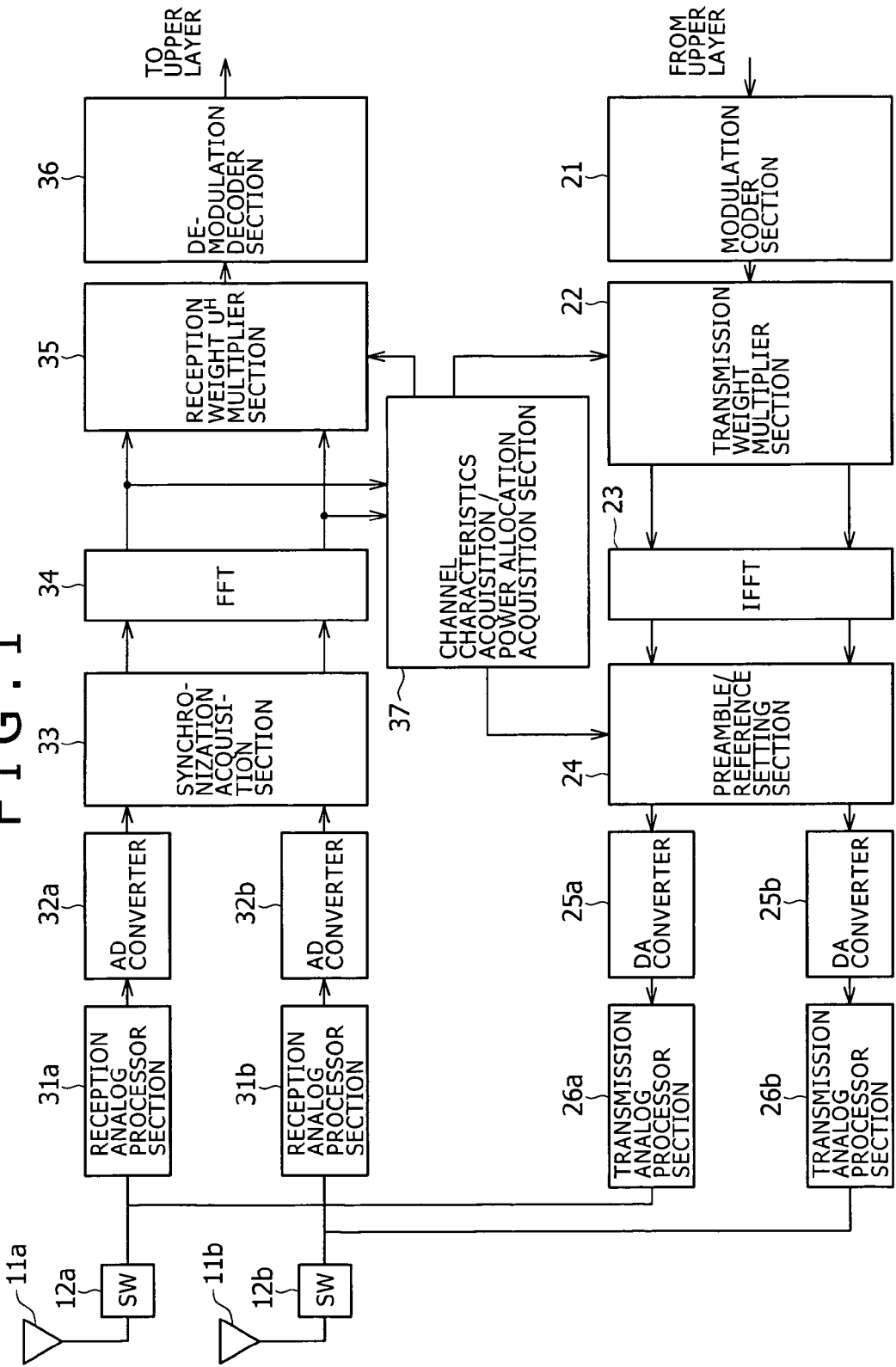
FIG. 1 is a view showing the configuration of a wireless communication apparatus according to an embodiment of the invention.

FIG. 1 shows the configuration of a wireless communication apparatus according to an embodiment of the invention. The wireless communication apparatus includes two transmission/reception antennas 11a and 11b and is able to perform data communication in accordance with the SVD-MIMO scheme. More specifically, in the event of transmission, individual transmission signals to be multiplexed are supplied with transmission antenna weight factors, space-time coded, allocated to the two transmission/reception antennas 11a and 11b, and then transmitted. On the side of the receiver, the multiplexed signals received by the two antennas 11a and 11b through channels are supplied with reception antenna weight factors and space-time decoded, thereby to receive reception data. According to the essence of the invention, however, the number of antenna is not limited to two, but may be three or more.

Transmit systems and receive systems are parallel connected to the respective transmission/reception antennas 11a and 11b through switches 12a and 12b. Thereby, signals are wirelessly transmitted to an other wireless communication apparatus, or signals transmitted from an other wireless communication apparatus are collected. However, it is assumed that the switch 12a, 12b exclusively connects the transmission/reception antenna 11a, 11b to the transmit system or the receive system, so that transmission and reception cannot be performed in parallel.

The respective transmit system includes a modulation coder section 21, a transmission weight multiplier section 22, an IFFT 23 (inverse fast Fourier transform), a preamble/reference setting section 24, a D/A converter 25, and a transmission analog processor section 26.

The modulation coder section 21 codes transmission data, which have been transmitted from an upper layer of a communication protocol, with an error correction symbol, and performs mapping of transmission signals in the signal spacing in accordance with a predetermined modulation scheme, such as BPSK, QPSK, 16QAM, 64QAM, or 256QAM. At this time point, a known data series may be interleaved as a pilot symbol in accordance with a pilot symbol interleave pattern and timing. In this case, pilot signals formed of a known pattern are interleaved in units of a sub-carrier or at the interval of several sub-carriers.

The transmission weight multiplier section 22 retains the transmission antenna weight matrix V acquired by performing singular value decomposition of the channel matrix H acquired by receiving reference symbols corresponding to the number of antennas that are transmitted from a transmission destination. Then, the multiplier section 22 performs multiplication of post-coding transmission signals by the transmission antenna weight matrix V, thereby to acquire a plurality of MIMO channels through spatial multiplexing. The transmission antenna weight matrix V is configured in accordance with information transmitted from a wireless communication apparatus working as a communication destination, and is set in the transmission weight multiplier section 22.

In the IFFT 23, modulated signals in a serial format are transformed and collated in parallel data for the number of parallel carriers in accordance with the number of parallel carriers and timing. Then, in accordance with a predetermined FFT size and timing, the IFFT 23 perform inverse fast Fourier transform (IFFT) for the FFT size. In this case, guard interval sections may be provided at the front and rear portions of one OFDM symbol to remove intersymbol interference. A time interval of the guard interval is determined in accordance with a maximum delay time of a delay wave that affects the state of a propagation path, that is, demodulation. Then, the signals are changed to serial signals and converted into signals on the time axis while maintaining the orthogonalities of the individual carriers on the frequency axis, and the signals are used as transmission signals.

The transmission signals are converted by the D/A converter 25 to analog baseband signals, the signals are further upconverted by the transmission analog processor section 26 to an RF frequency band, and the signals are then sent by the antennas 11 to the channels. In the present embodiment, power allocations to the individual MIMO channels are optimized thereby to obtain a communication capacity larger than that in the case of equal power allocations to the individual MIMO channels. In particular, larger transmission powers are allocated through the MIMO channels having high communication quality.

The respective receive system, on the other hand, is configured of a reception analog processor section 31, an A/D converter 32, a synchronization acquisition section 33, an FFT 34, a reception weight multiplier section 35, a demodulation decoder 36, and a channel characteristics acquisition/power allocation acquisition section 37.

Signals received from the antennas 11 are each downconverted in the reception analog processor section 31 from the RF frequency band to a baseband signal, and the signal is converted by the A/D converter 32 to a digital signal.

Subsequently, in accordance with a synchronization timing detected by the synchronization acquisition section 33, the received signal as serial data is converted to parallel data, the data are collated (in this case, the signals for one OFDM symbol including those to a guard interval are collated), the signal for an effective symbol length is Fourier transformed by the FFT 34, and signals for individual subcarriers are acquired. In this manner, signals on the time axis are converted to signals on the frequency axis.

In the channel characteristics acquisition/power allocation acquisition section 37, a communication destination first acquires a channel matrix H by using a reference signal to which weights are supplied in units of multiplex-transmitted signals, and a reception weight matrix describing antenna weights is calculated from the channel matrix H. For example, in the SVD-MIMO communication system, such the acquired channel matrix H is decomposed by singular value decomposition to obtain the transmission antenna weight matrix V, reception weight matrix $U^H$ as an antenna weight matrix W, and the diagonal matrix D. Each time the reference signal is transmitted from the communication destination at a predetermined interval, the channel characteristics acquisition/power allocation acquisition section 37 updates the channel matrix therewith, and performs singular value decomposition thereof.

In addition, the channel characteristics acquisition/power allocation acquisition section 37 acquires information regarding power allocations provided to the transmitter. For example, the operation may be arranged such that the transmitter preliminarily describes the power information in a per-stream reference signal, and the channel characteristics acquisition/power allocation acquisition section 37 reads the information. Alternatively, power allocations can be estimated in accordance with reception powers of per-stream user data after spatial separation of the reception signal. In addition, when performing the estimation of power allocations, also likelihood information of individual stream signals are taken into account, thereby to enable improving the accuracy of the estimation. Details of the method of acquiring the power allocations will be described below.

The reception weight matrix $U_H$ acquired through the singular value decomposition of the channel matrix is set in the reception weight multiplier section 35 of the local (own) apparatus, and the transmission antenna weight matrix V is fed back to the communication destination. For the reception weight matrix, however, the inverse matrix $DU^H$ of HV may be used instead of the reception antenna weight matrix $U_H$ (refer to the above description and equation (8)).

The reception weight multiplier section 35 then performs multiplication of the reception signal by the reception antenna weight matrix $U^H$ or $DU^H$ acquired by performing the singular value decomposition of the channel matrix H, thereby to spatially demultiplex the spatially multiplexed reception signal.

Further, in the demodulation decoder 36, the reception signal spatially demutiplexed is demapped in accordance with a predetermined modulation scheme, such as BPSK, QPSK, 16QAM, 64QAM, or 256QAM, and subjected to error correction and decoding. Thereby, the reception signal spartially demultiplexed becomes reception data, and the data is passed to an upper layer of a communication protocol.

The essence of the invention does not limit the scheme of acquiring the reception weight matrix from the channel matrix to the SVD. As relatively simple algorithms for acquiring the antenna weight matrix W from the channel matrix H, algorithms such as zero-forcing- and MMSE (minimum mean square error) are known. The present invention can be implemented by using these algorithms. Zero-forcing is a scheme based on the logic of completely eliminating crosstalk. The MMSE is a scheme based on the logic of maximizing the ratio between the signal current and square error (sum of the crosstalk power and the noise power). This scheme employs the concept of noise power of the receiver, wherein crosstalk is intentionally generated thereby to obtain the antenna weight matrix W (the channel matrix H is subjected an inverse matrix operation). When the two schemes are compared with one another, it is known that the MMSE is superior under a high noise environment.

In the wireless communication system according to the present embodiment, large transmission powers are allocated by the MIMO channels having high communication quality to optimize the power allocations to the individual MIMO channels, thereby to enhance the communication capacity. In this case, since the power allocation is varied in units of the spatially multiplexed channel on the side of the transmitter, there occurs the problem of disabling accurate demapping to be performed on the side of the receiver. As such, in the present embodiment, the channel characteristics acquisition/power allocation acquisition section 37 is used to acquire the power allocation information of the individual MIMO channels. Further, in the reception weight multiplier section 35, after the spatial separation performed through multiplication of the reception signal by the $U^H$ or $DU^H$ reception weight matrix, the power allocation values allocated to the individual communication channels are used to return the magnitudes of the reception signal points in the signal spacing of the respective communication channel to the original magnitudes, whereby accurate demapping can be performed.

A procedure of reception processing on the side of the receiver will be described herebelow by reference to the SVD-MIMO communication system as an example. In this case, it is assumed that the process to acquire the transmission antenna weight matrix V on the side of the transmitter has been preliminarily performed.

(Step 1)

A reference signal weighted with a transmission antenna weight matrix V is received, and HV is acquired as channel matrix information.

(Step 2)

An inverse matrix of HV is calculated (see the equation (8)).

(Step 3)

User data is received and subjected to weighting reception thereby to perform spatial separation by using the inverse matrix of HV.

(Step 4)

Using respective power allocation values allocated to the respective MIMO channels, the magnitudes are returned to the original magnitudes (the magnitudes of the amplitudes of reception signal points in the signal spacing are returned to the original magnitudes).

The receiver should preliminarily recognize how the powers have been allocated to the individual MIMO channels.

The following describes a method for the channel characteristics acquisition/power allocation acquisition section 37 to acquire the information regarding the power allocations provided to the individual MIMO channels on the side of the transmitter. For the convenience of description, it is assumed that two MIMO channels are formed and transmission weight vectors thereof are denoted by $v_1$ and $v_2$ (i.e., $V=[v_1,v_2]$).

The method usable on the side of the receiver to acquire the information regarding the power allocations can be exemplified by a method wherein a transmitter includes information regarding power allocations in transmission frames, and the information are interpreted on the side of the receiver thereby to acquire the power allocation information of the individual MIMO channels.

FIG. 2 shows an example configuration of a transmission frame of the type used in the above-described case. As shown therein, in the transmission frame, power allocation information non-multiplexed is added ahead of a reference signal for being used on the side of the receiver to obtain a channel matrix H (or, a reference signal weighted with V for acquiring HV that is used to obtain the reception weights).

The channel characteristics acquisition/power allocation acquisition section 37 interprets the description in the power allocation information, thereby being able to acquire the information regarding the power allocations to the individual MIMO channels.

The power allocation information is unnecessary information for the user data, and introduces a reduction in transmission efficiency. In particular, since the power allocation to each of the MIMO channel is described in a real number, so that the bit size thereof is unexpectedly large to the extent of imposing non-negligible influence on the transmission efficiency.

Other methods usable in the channel characteristics acquisition/power allocation acquisition section 37 to acquire the power allocation information of the individual MIMO channels include a method of acquiring the power allocation information of the individual MIMO channels in accordance with power information included in the reference signal transmitted from the transmitter.

FIG. 3 shows an example configuration of a transmission frame in the case of the other method. As shown therein, in the transmission frame, a reference signal for acquiring the power allocation information of the respective MIMO channel is added together with a reference signal for being used on the side of the receiver to obtain channel matrix H (or, a reference signal weighted with V for acquiring HV that is used to obtain the reception weights).

In this case, the reference signal for acquiring the channel matrix H is configured through time-division multiplexing of a reference signal multiplied by the individual transmission weights $v_1$ and $v_2$ in units of the transmission antenna. In comparison, the reference signal for acquiring the power allocation information is supplied with the per-channel power allocation and is transmitted by being weighted/spatially multiplexed with the transmission weights $v_1$ and $v_2$. FIG. 4 is a schematic view showing a time and space multiplex configuration of the transmission frame shown in FIG. 3.

In this case, in the channel characteristics acquisition/power allocation acquisition section 37, the reference signal being transmitted by being weighted/spatially multiplexed using the transmission weights $v_1$ and $v_2$ is spatially demultiplexed. Thereby, the power allocations can be acquired in accordance with the reception powers of the individual MIMO channels.

However, the reference signal for acquiring the power allocation information is unnecessary information for the user data and introduces a reduction in transmission efficiency.

In addition, as an other method usable in the channel characteristics acquisition/power allocation acquisition section 37 to acquire the power allocation information of the individual MIMO channels, a method can be contemplated in which the power allocation information is transmitted by being added to the time-division multiplexed reference signal multiplied by the individual transmission weights $v_1$ and $v_2$ for acquiring the channel matrix H.

FIG. 5 shows an example configuration of a transmission frame in the above-described case. As shown therein, in the transmission frame, the reference signal for being used on the side of the receiver to obtain channel matrix H (or, a reference signal weighted with V for acquiring HV that is used to obtain the reception weights) is added ahead of the user data.

In this case, the reference signal for being used to obtain channel matrix H is configured by time-division multiplexing signals multiplied by the individual transmission weights $v_1$ and $v_2$ in units of the transmission antenna. FIG. 6 is a schematic view showing a time and space multiplex configuration of the transmission frame shown in FIG. 5.

Similarly as in the spatial multiplexing, power allocations similar to those for the corresponding MIMO channels are set in transmission weight portions $v_1$ and $v_2$. For example, if the ratio between the power allocations to two MIMO channels is 7:3, the transmission power ratio is 0.7:0.3 with respect to the transmission power represented by 1.

In the case, unnecessary information for power allocation information notification is not added to the user data, so that the transmission efficiency is not affected. However, in the event that a large difference exists in the power allocations, a problem occurs in reliability. For example, when the ratio between the power allocations is 9:1, the transmission power of the one channel is 0.9 and the transmission power of the other channel is 0.1. This is equivalent to a signal deterioration of 10 dB, so that the reliability is significantly reduced.

As an other method for acquiring the information regarding the power allocations to the receiver, further proposed here is a method of estimating power allocations to the individual communication channels in accordance with the reception powers of the user data after having spatially demultiplexed. According to this method, the unnecessary information for power allocation information notification is not added to the user data, so that the transmission efficiency is not affected.

In this case, a reference signal weighted with V is received by the receiver. Then, a channel matrix HV is acquired by the channel characteristics acquisition/power allocation acquisition section 37 from the reference signal. Then, an inverse matrix of HV is calculated (see the equation (8)). Thereafter, the user data is once stored in memory.

The channel characteristics acquisition/power allocation acquisition section 37 takes out the first one OFDM symbol of the user data from the memory, and multiplies it by the inverse matrix of HV. As a result of the multiplication by the inverse matrix of HV, a plurality of spatial channel signals are separated from one another. Thereby, only desired spatial channel signals can be acquired. Concurrently, influence of phasing of the transmission path as well is eliminated. The signals are each a signal varied in the amplitude corresponding to the power allocation. A signal transmitted at 0.3 of the power when being transmitted as a whole at 1.0 of the power is multiplied by the square root of (1/0.3), whereby the amplitude can be returned to the signal point in original signal spacing.

Figure 7:
FIG. 7 is a schematic view of a functional configuration in a power allocation estimation portion.
Figure 8:
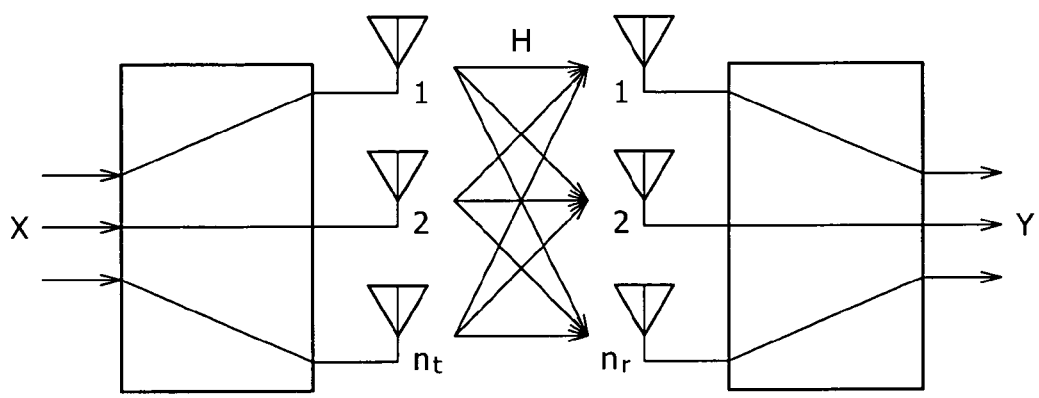
FIG. 8 is a conceptual view of a MIMO communication system.
Figure 9:
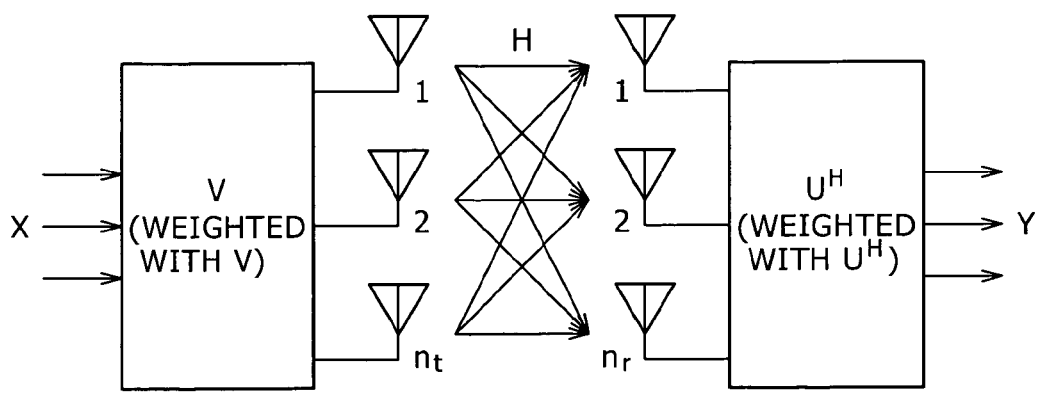
FIG. 9 is a conceptual view of an SVD-MIMO communication system.

FIG. 7 is a schematic view of a functional configuration in a power allocation estimation portion. As shown therein, the configuration includes a spatial separation section, a power acquiring section, and a power-allocation estimation section. The spatial separation section multiplies the reception signal by the inverse matrix of HV, thereby to separate the signal into a plurality of spatial channel signals. The power acquiring section acquires the power of the respective channel signal spatially separated. The power-allocation estimation section estimates the per-channel power allocation in accordance with the power acquisition result. The reception signals on the respective channels are remapped in the signal spacing in accordance with the power acquisition results, thereby to make it possible to accurate demapping in the demodulation decoder 36.

A method of estimating the power allocation in accordance with the user data described above will be described hereunder.

In any type of modulation scheme, the user data are mapped in the transmitter so that the average of powers of the individual signal points becomes 1.0. As such, the power-allocation estimation section calculates powers and the average thereof 52 items of data (in the case that the one OFDM symbol is configured of 52 subcarriers) in the one OFDM symbol (after multiplied by the inverse matrix of HV) of the user data. When the resultant value is, for example, 0.3, the power allocation can be estimated to be 0.3.

In the case of BPSK being employed, only items of −1 and +1 exist in the signal spacing. In comparison, in the case of 16QAM, although a plurality of power levels of signal points exists, the values are normalized so that the powers become one when all the signal points are used at the same frequency on overage. On the side of the transmitter, since a scrambler is applied, it is guaranteed that the individual signal points of 16QAM are used with the same probability. Accordingly, the estimation of power allocations can be performed, as described. Of course, even more accurate power estimation can be implemented with two OFDM symbols.

One more power allocation estimation method will be described herebelow.

According to IEEE 802.11a, which is a LAN system being used as an adaptation object of SVD-MIMO communication, the number of OFDM subcarriers is specified to be 52, and four pieces thereof are specified to be used as pilot carriers. Inherently, pilot carriers are used to correct for phase rotation associated with clock error between a transmitter and a receiver. However, pilot carriers can be used as well for transmission power allocation in communication using SVD-MIMO.

Pilot carriers are each transmitted to the transmitter at the value of ±1 in the signal spacing. As such, on the side of the receiver, the powers of the pilot carriers are measured for a certain numbers of OFDM symbols, and power allocations to corresponding MIMO channels are estimated in accordance with the resultant values. Similar to the case described above, the reception signal on the individual MIMO channels are multiplied by the square root of 1/(pilot carrier power), thereby to enable returning the magnitudes of the amplitudes of the reception signal points in the signal spacing. That is, a feature exists in that the pilot carriers, which are inherently used for the phase correction, are used to correct for amplitude variations, i.e., power directions.

Figure 10:
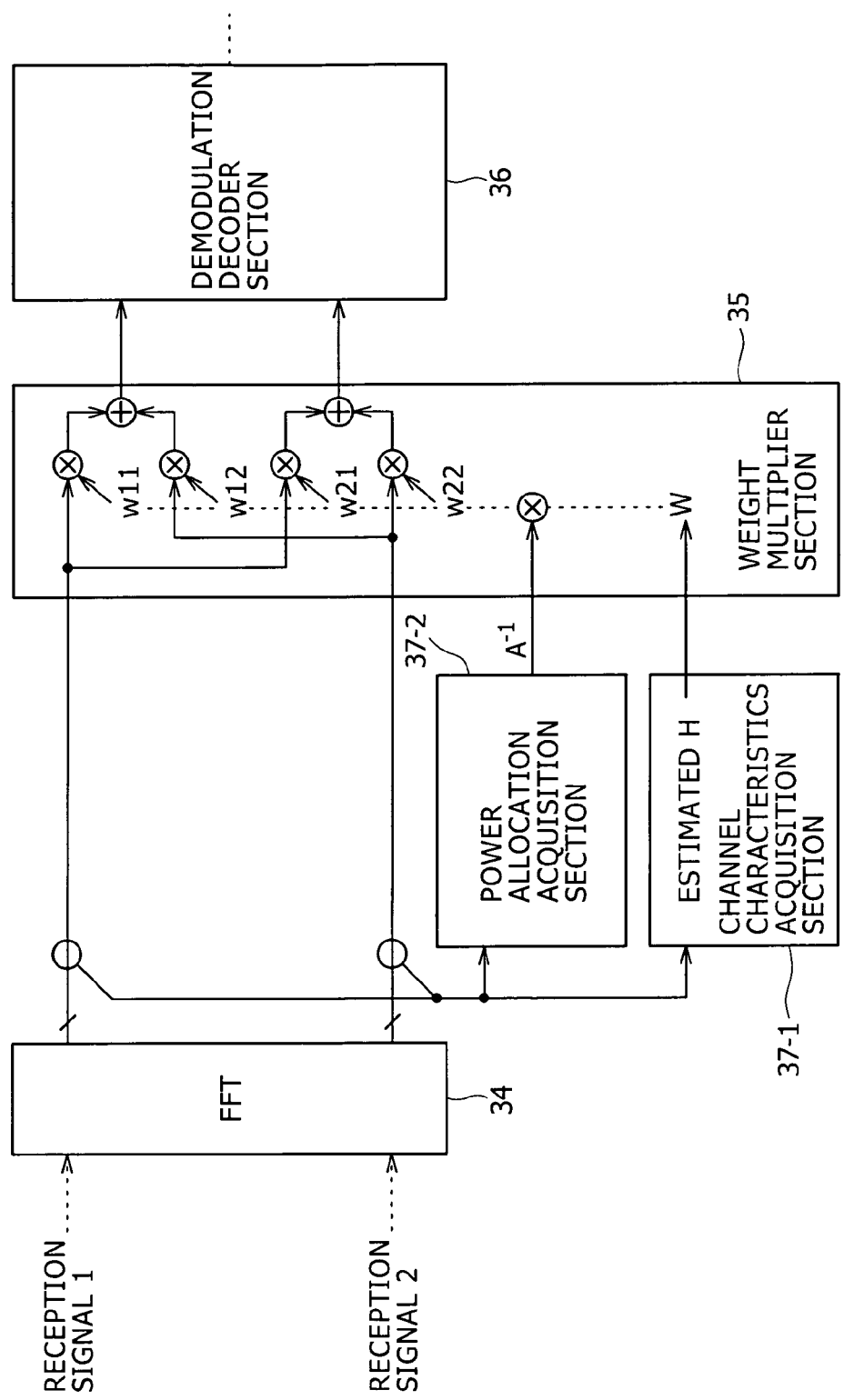
FIG. 10 is a schematic view of a functional configuration in a power allocation estimation portion.

FIG. 10 is a schematic view of a functional configuration in a power allocation estimation portion in the case described above.

Reception signals 1 and 2 from the respective antennas 11a and 11b are Fourier transformed by the FFT 34, thereby becoming an OFDM symbol including a plurality of subcarriers continually disposed on the frequency axis from the signals on the time axis.

A channel characteristics acquisition section 37-1 acquires a channel matrix H by using, for example, a reference signal portion, and calculates a reception weight matrix having the description of antenna weights from the channel matrix H. In the case of, for example, the SVD-MIMO communication system performs singular value decomposition of the channel matrix H, thereby to acquire the reception antenna weight matrix $U^H$. Of course, the channel characteristics acquisition section 37-1 may be imparted a function of calculating the antenna weight matrix W by using such algorithms as zero-forcing or MMSE.

A power allocation acquisition section 37-2 performs measurement of powers of individual pilot carriers of individual streams for a certain number of OFDM symbols, and a square root $A^{-1}$ of 1/(pilot carrier power) is estimated to be a power allocation of the respective signal.

Then, in an antenna weight matrix multiplication section 35, the reception signal 1, 2 from the respective antenna is multiplied by a matrix acquired through a multiplication of the antenna weight matrix W by the $A^{-1}$ power allocation. Thereby, when separating the signal into per-stream signals, the magnitudes of the amplitudes of the reception signal points in the signal spacing can be returned to the original magnitudes.

In this case, improving the accuracy of the power allocation estimation on the side of the receiver enables improving determination accuracy of demapping of a subsequent stage thereof, consequently leading to performance enhancement of the entirety of the receiver.

Figure 11:
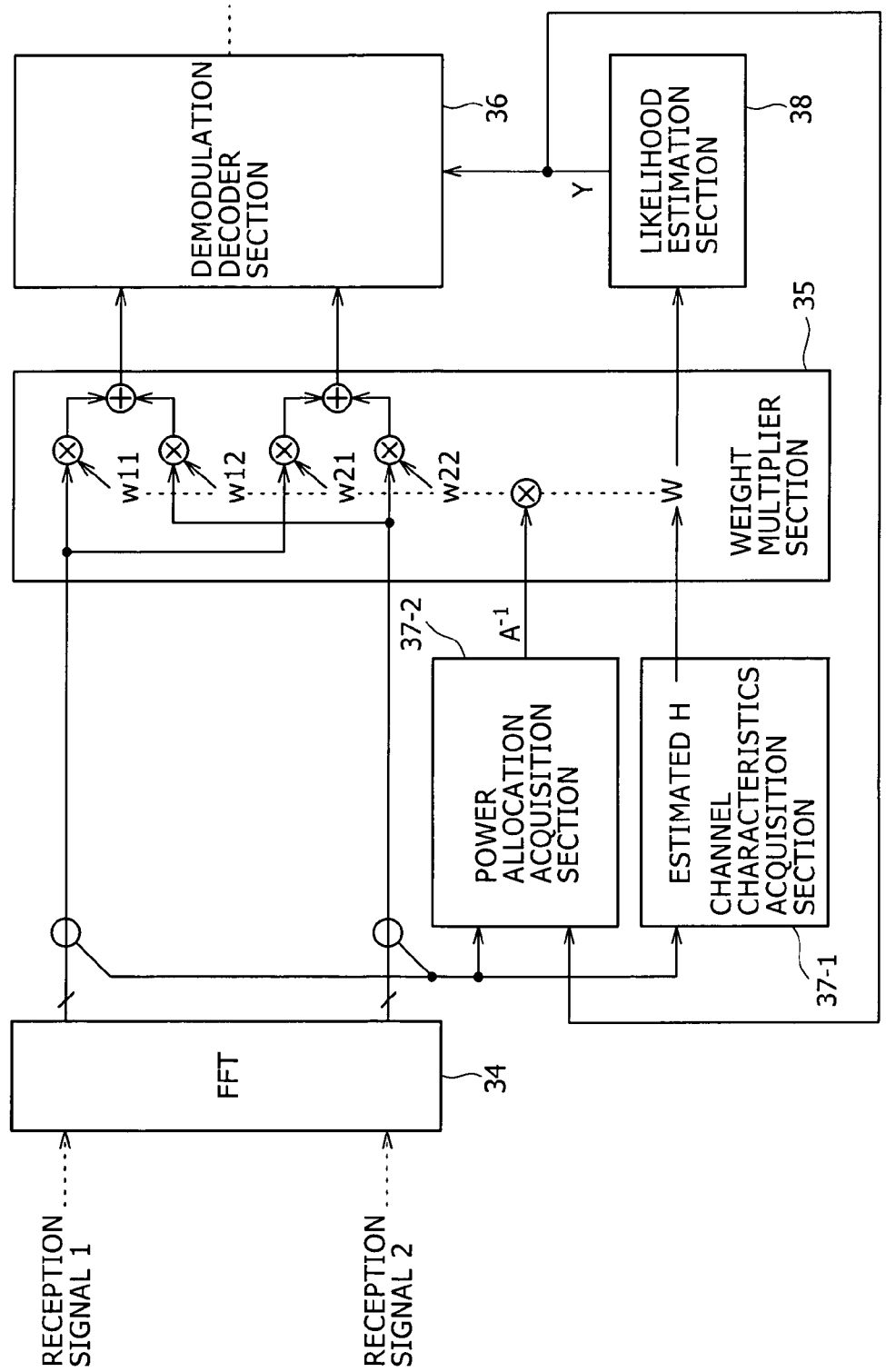
FIG. 11 is a schematic view of a functional configuration in a power allocation estimation portion.

As a practical example, the power allocation of the respective stream can be accurately estimated by using not only the reception power of the per-stream user data, but also the likelihood information of the respective stream signal, even more accurate power allocation of the respective stream can be estimated. Further, even more accurate demapping can be implemented by reference to information of the power allocation estimation information. FIG. 11 is a schematic view of a functional configuration in a power allocation estimation portion in the case of the above-described practical example.

Reception signals 1 and 2 from the respective antennas 11a and 11b are Fourier transformed by the FFT 34, thereby becoming an OFDM symbol including a plurality of subcarriers continually disposed on the frequency axis from the signals on the time axis.

The channel characteristics acquisition section 37-1 acquires the channel matrix H by using, for example, the reference signal portion, and calculates a reception weight matrix having the description of antenna weights from the channel matrix H. In the case of, for example, the SVD-MIMO communication system performs singular value decomposition of the channel matrix H, thereby to acquire the $U^H$ reception weight matrix. Of course, the channel characteristics acquisition section 37-1 may be imparted a function of calculating the antenna weight matrix W by using such algorithms as the zero-forcing or MMSE.

A power allocation acquisition section 37-2 performs detections of powers of pilot carriers of individual streams for a certain number of OFDM symbols. As a base for accuracy of a value of the respective detection, the power allocation acquisition section 37-2 uses a likelihood estimation value of a signal acquirable from a likelihood estimation section 38. Then, the power allocation acquisition section 37-2 outputs a square root $A^{-1}$ of 1/(pilot carrier power) to be a more accurate power allocation estimation value for the signal. In practice, detection values of a plurality of signal powers are averaged to thereby estimate the power allocation of the respective stream. In this case, as shown in an equation given below, the stream is weighted with the likelihood estimation value. In the equation, l represents a stream serial number, $P_l$ denotes the signal current of an l-th stream, and $Y_l$ denotes the likelihood amplitude.

$$A_l = \sqrt{\frac{\sum P_l \cdot Y_l^2}{\sum Y_l^2}} \qquad (9)$$

Then, in an antenna weight matrix multiplication section 35, reception signal 1, 2 from the respective antennas is multiplied by a matrix acquired through a multiplication of the antenna weight matrix W by the power allocation $A^{-1}$. Thereby, when separating the signal into per-stream signals, the magnitudes of the amplitudes of the reception signal points in the signal spacing can be returned to the original magnitudes.

As shown in equation (9) given above, weight-averaging is performed with the likelihood amplitude thereby to enable acquiring an even more accurate power allocation estimation value. Thereby, determination accuracy of demapping of a subsequent stage thereof is expected, consequently leading to performance enhancement of the entirety of the receiver.

As shown in FIG. 11, in the case of acquiring the power allocation of the respective stream by using the likelihood information of the respective signal as well as the signal power of the reception signal after spatially demultiplexed, the likelihood information of the respective stream has to be acquired by the likelihood estimation section 38 in the receiver in accordance with a certain method.

In MIMO communication, on the side of the receiver, the channel matrix of the logical channels are estimated, the antenna weight matrix is acquired in accordance with the estimated channel matrix, the received signals from the individual antennas are multiplied by the antenna weight matrix, thereby to be spatially separated into the individual stream signals. For example, in the zero-forcing, equation (10) given below can be used as a post-spatial-decoding relative estimation value. This approach is based on the fact that, predicting that expected values of post-spatial-decoding signal amplitudes equally become 1, the square norm of the weight vector of the respective stream becomes equal to the gain of the noise power.

$$SNR_{ZF}(l) = \frac{1}{\|\dot{w}_l\|^2} \quad (10)$$

$$\dot{w}_l = [w_{l1} \cdots w_{ln} \cdots w_{lN}] \quad (11)$$

$$W = [\dot{w}_1 \cdots \dot{w}_l \cdots \dot{w}_L]^T \quad (12)$$

Where,
l: Stream serial number
L: Number of streams
n: Reception-branch serial number
N: Number of reception branches
W: Antenna weight matrix
$\dot{w}_l$: Antenna weight vector of l-th stream The above equation (11) represents that an antenna weight vector of an l-th stream is a vector formed of the element of a win antenna weight between itself and a respective reception branch n. The above equation (12) represents that the antenna weight matrix W is a matrix formed of per-stream antenna weight vectors. The gain associated with the spatial decoding process in a respective stream is the square norm of the antenna weight vector of that stream. The above-described equation (10) acquires the SNR regarding the post-spatial-decoding l-th stream from the inverse number of the square norm of the antenna weight vector of the stream.

The likelihood estimation section 38 passes the square root of an SNR estimation value indicated in equation (13) below as a likelihood amplitude Y to the power allocation acquisition section 37-2. As can be seen from the above equation (10), such likelihood information is estimated by using only the antenna weight matrix.

$$Y=\sqrt{SNR_{ZF}(l)} \quad (13)$$

In comparison, the MMSE has such aspects where crosstalk (inter-stream interference) in the event of the antenna weight matrix calculation is intentionally generated, and the expected value of the post-spatial-decoding signal amplitude value is not limited to 1. In view of these facts, it is considered difficult to expect accuracy from the likelihood estimation value using only the antenna reception weight matrix as is indicated in the above equation (13).

Figure 12:
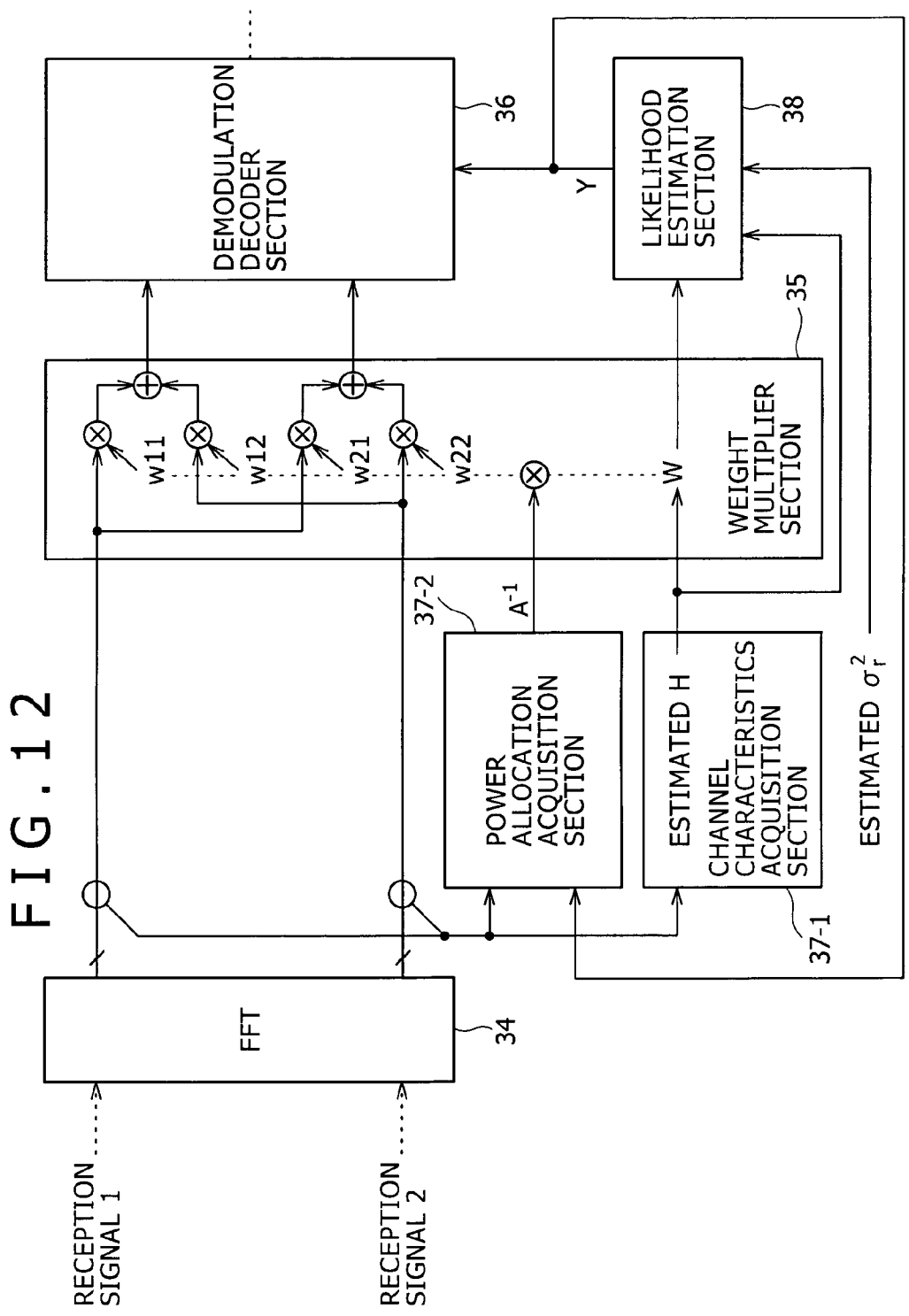
FIG. 12 is a schematic view of a functional configuration in a power allocation estimation portion.

In view of the above, in a modified example of the configuration shown in FIG. 11, the likelihood estimation section 38 more accurately estimates the likelihood information in accordance with three items of information, namely, estimated channel matrix, antenna reception weight matrix, and estimated noise power, and supplies the result to the power allocation acquisition section 37-2. More specifically, a signal power S, an interference power I, and a noise power N are, respectively, calculated in units of the post-spatial-decoding stream signal from the estimated channel matrix, the antenna reception weight matrix, and the estimated noise power, and likelihood amplitude information configured of the square root of S/(I+N) is passed to the power allocation acquisition section 37-2. FIG. 12 is a schematic view of a functional configuration in a power allocation estimation portion according to the modified example.

Reception signals 1 and 2 from the respective antennas 11a and 11b are Fourier transformed by the FFT 34, thereby becoming an OFDM symbol including a plurality of subcarriers continually disposed on the frequency axis from the signals on the time axis. The channel characteristics acquisition section 37-1 calculates the antenna weight matrix W by using the MMSE algorithm from the channel matrix H acquired from, for example, a reference signal portion.

The power allocation acquisition section 37-2 performs detections of powers of pilot carriers of individual streams for a certain number of OFDM symbols. As a base for accuracy of a value of the respective detection, the power allocation acquisition section 37-2 uses a likelihood estimation value of a signal acquirable from the likelihood estimation section 38, and outputs a square root $A^{-1}$ of 1/(pilot carrier power) to be a more accurate power allocation estimation value for the signal (same as above). Then, in an antenna weight matrix multiplication section 35, reception signal 1, 2 from the respective antennas is multiplied by a matrix acquired through a multiplication of the antenna weight matrix W by the power allocation $A^{-1}$. Thereby, the magnitudes of the amplitudes of the reception signal points in the signal spacing can be returned to the original magnitudes.

In this stage, the likelihood estimation section 38 has inputs of three items of information, namely, the estimated channel matrix H, antenna weight matrix W, and estimated noise power $\sigma_r^2$. From these values, the section 38 directly estimates the individual noise power signal power, and interference power, and acquires SINR (signal-to-interference-and-noise ratio) from the estimation values.

$$SNR_{MMSE}(l) = \frac{\hat{S}_l}{\hat{I}_l + \hat{N}_l} \quad (14)$$

Then the likelihood estimation section 38 supplies the power allocation acquisition section 37-2 with likelihood amplitude information composed of the square root of the calculated SINR.

$$Y=\sqrt{SINR_{MMSE}(l)} \quad (15)$$

The following is a calculation expression (equation) for directly acquiring a noise power, signal power, and interference power from the input, estimated channel matrix H, antenna weight matrix W, and estimated $\sigma_r^2$ noise power.

$$\hat{N}_l = \|\hat{w}_l\|^2 \sigma_r^2 \quad (16)$$

$$\hat{S}_l = \|\hat{w}_l \cdot h_l\|^2 - \hat{N}_l \quad (17)$$

$$\hat{I}_l = \sum_{i=1(i \neq l)}^{L} \left(|\hat{w}_l \cdot h_l|^2\right) \quad (18)$$

$$h_l = [h_{1l} \cdots h_{nl} \cdots w_{Nl}] \quad (19)$$

$$H = [\hat{h}_1^T \cdots \hat{h}_l^T \cdots \hat{h}_N^T] \quad (20)$$

Where,
$\sigma_r^2$: Estimated noise power of the spatially multiplexed signal; and
H: Estimated channel matrix.

$\sigma_r^2$ is the noise power included in a pre-spatial-decoding signal. The gain associated with the spatial decoding process on the respective stream is the square norm of the antenna weight vector of the stream. Accordingly, in the above equation (16), the noise power value included in the respective post-spatial-decoding stream is acquired with the product of the multiplication of the square norm of the antenna weight vector of the stream and the noise power included in the pre-spatial-decoding signal.

The above equation (19) represents that the channel vector of the l-th stream is a vector formed of the element of a channel estimation value $h_{nl}$ between itself and a respective reception branch n. The above equation (20) represents that the channel matrix H is a matrix including transposed vectors of the per-stream channel vectors in the form of column vectors. An expected value of the signal amplitude of the respective post-spatial-decoding stream can be acquired from a scalar product of the antenna weight vector and channel vector in the stream. The square norm of the scalar product can be said to be the signal power of the respective post-spatial-decoding stream, however, the power value is mixed with noise power. As such, according to the above equation (17), the result acquired through a subtraction of the noise power acquired by the above equation (16) being performed on a power value calculated from the square norm of the above-described scalar product is acquired as a true signal power estimation value of the stream.

The amplitude of an interference signal of the respective post-spatial-decoding stream can be acquired from the scalar product of the antenna weight vector of the stream and the channel vector of an other stream. As such, in the above equation (18), an interference signal power in the stream is acquired from the total sum of the square norms of the scalar products.

Assigning the noise power, signal power, and interference power acquired using the above equations (16) to (18) enables acquiring a more appropriate SINR value in the event of acquiring the antenna weight matrix in accordance with the MMSE algorithm. In addition, as indicated in the above equation (15), the likelihood amplitude formed of the square root of the SINR value can be acquired as likelihood information with enhanced high probability. Consequently, even in the MMSE intentionally causing crosstalk, the likelihood information with relatively high probability can be passed to the power allocation acquisition section 37-2, so that performance deterioration in the entirety of the receiver can be restrained.

The following described a transmission/reception procedure in the wireless communication system according to the present embodiment with reference to the SVD-MIMO communication scheme as an example. Although a case where a transmission authority is acquired in accordance with the RTS (request-to-send)/CTS (clear-to-send) procedure is exemplified, the essence of the invention is not limited thereto.

(Step 1)
A transmission-request RTS packet is transmitted to the receiver.

(Step 2)
A transmission-verification-response CTS packet is transmitted in response from the receiver to the transmitter. A reference signal for estimating a channel matrix H is added in the beginning of the CTS packet.

(Step 3)
The transmitter acquires the channel matrix H from the reference signal of the CTS packet. If calibration is performed in the transmitter and the receiver, H on the uplink and H on the downlink are identical to each other.

(Step 4)
The transmitter performs singular value decomposition of the acquired channel matrix H. Thereby, $H=UDV^H$ is acquired.

(Step 5)
The transmitter transmits a DATA packet by using acquired V. The DATA packet has a configuration including an area of a reference signal time-division multiplexed in units of the MIMO channel weighted with V, and subsequent spatially multiplexed user data weighted with V.

(Step 6)
The receiver acquires an HV channel matrix from the reference signal weighted with V of the DATA packet.

(Step 7)
The receiver calculates an inverse matrix of the HV channel matrix (see refer to equation (8)).

(Step 8)
The receiver performs multiplication of a first symbol by using the inverse matrix of HV.

(Step 9)
The receiver acquires the average of powers in 52 subcarriers of the user data multiplied by the inverse matrix of HV (or, the power of the pilot carrier), and sets the result to be an estimation value for the power values.

(Step 10)
The receiver again performs multiplication by the inverse matrix of HV, starting with the first OFDM symbol.

(Step 11)
The receiver performs multiplication of the user data, which is multiplied by the inverse matrix of HV, by sqrt(1.0/(power allocation estimation value)), thereby to perform adjustment of the magnitudes of the amplitudes of reception signal points in the signal spacing.

(Step 12)
The receiver performs demapping and thereby receives the user data.

Finally, optimization of the MIMO communication capacity by the transmission power allocation will be described herebelow.

According to the SVD-MIMO communication scheme, when the power is equally allocated to the transmission antennas on the side of the transmitter, each ratio thereof is the same as each of the ratios of the powers of the mutually independent MIMO channels. The amounts of transmission capacity in the event of transmission of a plurality of streams are quantitatively described in a publication as "On limits of wireless communications in a fading environment when using multiple antennas", jointly written by G. J. Foschini and M. J. Gans (Wireless Personal Communications, vol. 6, No. 3, pp. 311-335, March 1998).

A case is now assumed such that the average of noise powers at the individual reception antennas is N; signals having a power S are transmitted by $n_t$ antennas and received by $n_r$ antennas; and the communication capacity of a plurality of mutually-independent MIMO channels is a communication capacity C (bits/sec/Hz) of the MIMO communication system. The communication capacity is represented by the following equation:

$$C = \sum_{n=1}^{min(n_t,n_r)} \log_2(1 + \lambda_n S/N/\min(n_t, n_r)) \quad (21)$$

The above equation (21) is modified to the following equation by using the formula log A+log B=log AB:

$$C = \log_2 \sum_{n=1}^{min(n_t,n_r)} (1 + \lambda_n S/N/\min(n_t, n_r)) \quad (22)$$

Further, the above equation (22) is modified from the formulas $\det|A|=\lambda_1\lambda_2 \ldots \lambda_n$ and $\det(I+A)=|I+A|=(1+\lambda_1)(1+\lambda_1)\ldots(1+\lambda_n)$.

$$C = \log_2 \det\left(I_{min(n_t,n_r)} + \frac{S}{N\min(n_t, n_r)} HH^H\right) \quad (23)$$

The communication capacity represented by the above equation (23) is in the case of equal power allocations to the individual MIMO channels. In practice, the communication capacity is variable depending on the MIMO channel in the range of a MIMO channel with a high SN ratio (eigenvalue λ is large) to a MIMO channel with a low SN ratio (eigenvalue λ is small). As such, a larger communication capacity then that represented by the above equation (23) can be acquired depending on the power allocation.

In the above equation (21), the S/min($n_t$,$n_r$) portion represents that the overall transmission power S is equally allocated to a plurality of logically mutually-independent MIMO channels. However, the power different in units of the MIMO channel is allocated and optimized. As such, where the transmission power allocated to the respective MIMO channel is Pn and the noise component N is $\sigma_2$, the equation for the communication capacity C of the entire system can be rewritten to the following equation:

$$C = \sum_{n=1}^{min(n_t,n_r)} \log_2(1 + \lambda_n P_n/\sigma^2) \quad (24)$$

The problem of how to allocate a transmission power $P_t$ to maximize the overall communication capacity can be solved by, for example, a water filling principal. For the convenience of description, way or progressive calculation expressions are omitted herefrom, but a power $P_n$ for maximizing the communication capacity is conclusively represented by the following equation:

$$P_n = \frac{P_T + \sum_{n=1}^{min(n_t,n_r)} \frac{\sigma^2}{\lambda_n}}{\min(n_t, n_r)} - \sigma^2 \quad (25)$$

The communication capacity C (bits/sec/Hz) in this case is represented by the following equation:

$$C = \sum_{n=1}^{min(n_t,n_r)} \log_2\left(1 + \lambda_n\left[\frac{P_T + \sum_{n=1}^{min(n_t,n_r)} \frac{\sigma^2}{\lambda_n}}{\min(n_t, n_r)} - \sigma^2\right]_n / \sigma^2\right) \quad (26)$$

The above is the maximum communication capacity of the MIMO system. Thus, in the case that transmission/reception antennas are provided, when spatial communication functions therebetween are determined and eigenvalues of a covariance matrix thereof are acquired, the communication capacity thereof is uniquely determined.

As in the above equation (13), the water filling principal refers to a principal that sets the respective transmission power to a value acquired by subtraction from the amount proportional to attenuation of the channel. In this view, the principal corresponds to allocation of a large transmission power by use of a high quality channel.

In the event of allocation of a different modulation scheme in units of the transmission stream in accordance with communication quality, power allocations to respective streams can be determined by using the water filling principal to cause the communication quality to be close to uniformity between the streams. According to the water filling principal, when the noise power is variable depending on the band or time, the power is set in units of the band or time so as to cause the sums (reference powers) of measured noise powers and signal powers to be identical, thereby to perform communication, whereby the communication capacity per average transmission signal power can be enhanced. The reference power is determined in accordance with, for example, error correction capability for the symbols being used for coding and feedback on the reception state on the side of the receiver.

Thus the present invention has been shown and described in detail by reference to certain embodiments. However, it is apparent or self-evident that those skilled in the art may carry out modifications and alterations or substitutions of the embodiments without departing the essence or spirit and scope the invention.

The invention is not limited in applicability to spatial-divisional, i.e., spatially orthogonal multiplex communication schemes, such as SVD-MIMO schemes. Further, similarly as above, the invention can be suitably adapted to other types of wireless communication systems that perform power allocation in units of a spatially multiplexed communication channel.

More specifically, it is to be understood that the invention has been shown and described merely in term of exemplary embodiments, so that the contents of description of the present Specification is not to be restrictively interpreted, but the appended claims should be referenced to determine the essence of the invention.

It should be understood by those skilled in the art that various modifications, combinations, sub-combinations and alterations may occur depending on design requirements and other factors insofar as they are within the scope of the appended claims or the equivalents thereof.

What is claimed is:

1. A wireless communication system for performing data communication by using a plurality of spatially multiplexed communication channels between a transmitter and a receiver, the wireless communication system comprising:
a transmitter to allocate a transmission power to each of the communication channels, mapped in signal spacing, and spatially multiplexed, to perform data communication; and
a receiver to spatially separate received data, estimate power allocation information of each of the communication channels after the spatial separation of the received data in accordance with reception power of a pilot carrier included in user data, and demap based on the estimated power allocation information.

2. The wireless communication system according to claim 1, wherein
the transmitter has a plurality of transmission antennas and the receiver has a plurality of reception antennas;
the transmitter allocates transmission data to a plurality of streams and performs weighting transmission thereof from each of the transmission antennas; and
the receiver performs weighting reception of the stream through each of the reception antennas.

3. The wireless communication system according to claim 2, wherein
the transmitter acquires optimal transmission antenna weight factors in accordance with feedback information received from the receiver.

4. The wireless communication system according to claim 1, wherein
the transmitter allocates the transmission power in correspondence to communication quality of the each communication channel.

5. The wireless communication system according to claim 1, wherein
the receiver uses a power allocation value allocated to the each communication channel to return a magnitude of an amplitude of each reception signal point in the signal spacing in the each communication channel to an original amplitude.

6. The wireless communication system according to claim 1, wherein
the receiver estimates a power allocation of each stream in accordance with both a reception power of per-stream user data in a state after spatial separation of the reception signal and likelihood information of each stream signal.

7. The wireless communication system according to claim 1, wherein
the receiver estimates the power allocation of the each stream in accordance with both a reception power of a pilot carrier included in the per-stream user data in a state after spatial separation of the reception signal and the likelihood information of the each stream signal.

8. A wireless communication apparatus for receiving data transmitted by using a plurality of spatially multiplexed communication channels, wherein a transmission power is allocated to each of the communication channels on the side of a transmitter, the wireless communication apparatus comprising:
receiving means for receiving a signal from each of the communication channels and performing spatially separation thereof;
power allocation information acquisition means for acquiring power allocation information for each of the communication channels by estimating after spatial separation of the signal received by the receiving means in accordance with reception power of a pilot carrier included in user data; and
demodulating means for demapping a reception signal in each of the communication channels spatially separated in accordance with the acquired power allocation information.

9. The wireless communication apparatus according to claim 8, further comprising a plurality of reception antennas, wherein
the receiving means performs weighting reception, through each of the reception antennas, of transmission data allocated to a plurality of streams and transmitted by weighting transmission.

10. The wireless communication apparatus according to claim 8, wherein
in the transmitter, power allocation is performed in units of the communication channels in correspondence to communication quality of the each communication channel.

11. The wireless communication apparatus according to claim 8, wherein
the demodulating means uses a power allocation value allocated to each of the communication channels to return a magnitude of an amplitude of each reception signal point in signal spacing in each of the communication channels to an original amplitude.

12. The wireless communication apparatus according to claim 8, further comprising likelihood estimation means that estimates likelihood information of each stream signal in a state after spatial separation of the reception signal.

13. The wireless communication apparatus according to claim 12, wherein
the power allocation information acquisition means estimates the power allocation of the each stream in accordance with both the reception power of the per-stream user data in the state after spatial separation of the reception signal and likelihood information of the each stream signal.

14. The wireless communication apparatus according to claim 12, wherein
the power allocation information acquisition means acquires a power estimation value of the stream by performing weighting and averaging of a reception power of a pilot carrier, which is included in the per-stream user data, after spatial separation of the reception signal, with a likelihood amplitude of the stream signal.

15. The wireless communication apparatus according to claim 12, further comprising a plurality of reception antennas, wherein spatial multiplex data communication is performed by using a plurality of logical channels formed between the apparatus and a transmitter including a plurality of antennas,
wherein
the receiving means estimates a channel matrix of the logical channels, acquires an antenna weight matrix in accordance with the estimated channel matrix, performs a multiplication of a reception signal from each of the antennas by the antenna weight matrix to perform spatial separation into a signal of each stream; and the likelihood estimation means estimates the likelihood information in accordance with the antenna weight matrix.

16. The wireless communication apparatus according to claim 15, wherein the receiving means estimates the channel matrix in accordance with an MMSE (minimum mean square error) algorithm based on logic of maximizing a ratio between a signal power and a square error; and the likelihood estimation means estimates the likelihood information from the estimated channel matrix, an antenna reception weight matrix, and an estimated noise power.

17. The wireless communication apparatus according to claim 16, wherein the likelihood estimation means calculates, respectively, a signal power S, an interference power I, and a noise power N in units of a stream in a state after spatial decoding from the estimated channel matrix, the antenna reception weight matrix, and the estimated noise power, and determines a likelihood amplitude made of a square root of S/(IN) to be the likelihood information.

18. The wireless communication apparatus according to claim 17, wherein the likelihood estimation means acquires the noise power N included in the each stream in the state after spatial decoding by the product of a square norm of an antenna weight vector of the stream multiplied by a noise power included in the signal in a state before spatial decoding.

19. The wireless communication apparatus according to claim 17, wherein the likelihood estimation means acquires, as a true signal power estimation value S, a result of a subtraction of the noise power N performed on a power value acquired from a square norm of a scalar product of an antenna weight vector and a channel vector in the each stream in the state after spatial decoding.

20. The wireless communication apparatus according to claim 17, wherein the likelihood estimation means acquires the interference power I of the each stream in the state after spatial decoding from a total sum of square norms of scalar products of an antenna weight vector of the stream and channel vectors of streams other than the stream.

21. A wireless communication method for receiving data transmitted by using a plurality of spatially multiplexed communication channels, wherein a respective transmission power is allocated to each of the communication channels on the side of the transmiteer side, the wireless communication apparatus comprising:

receiving a signal from each of the communication channels and performing spatial separation thereof;

acquiring power allocation information for each of the communication channels by estimating after spatial separation of the signal received by the receiving means in accordance with reception power of a pilot carrier included in user data; and demapping a reception signal in each of the communication channels spatially separated in accordance with the power allocation information acquired.

22. A non-transitory computer-readable storage medium storing therein a computer program written in a computer readable format, which, when executed by a processor, causes the processor to execute a method of receiving data transmitted by using a plurality of spatially multiplexed communication channels, wherein a respective transmission power is allocated to each of the communication channels on the side of a transmitter, the method comprising:

receiving a signal from each of the communication channel and performing spatial separation thereof;

acquiring power allocation information for each of the communication channels by estimating after spatial separation of the signal received by the receiving means in accordance with reception power of a pilot carrier included in user data; and demapping a reception signal in each of the communication channels spatially separated in accordance with the power allocation information acquired.

* * * * *